United States Patent [19]

Michaels

[11] Patent Number: 4,622,090

[45] Date of Patent: Nov. 11, 1986

[54] APPARATUS AND METHOD FOR GROOVING A LAMINATE SHEET

[76] Inventor: John Michaels, 16 Irvington, Tonawanda, N.Y. 14150

[21] Appl. No.: 791,336

[22] Filed: Oct. 25, 1985

[51] Int. Cl.$^4$ .............................................. B27F 1/04
[52] U.S. Cl. .................... 156/257; 83/875; 144/136 G; 144/346; 144/371; 156/227; 156/268; 156/443; 156/510
[58] Field of Search ................. 83/875; 144/345, 346, 144/355, 136 R, 136 G, 371; 156/257, 268, 227, 443, 510; 409/235, 228

[56] References Cited

U.S. PATENT DOCUMENTS

| | | | |
|---|---|---|---|
| 963,491 | 6/1910 | Whitmore | 144/353 |
| 2,246,660 | 6/1941 | Bawthenheimer | 156/211 |
| 3,058,868 | 10/1962 | Schroeder | 156/211 |
| 3,456,701 | 7/1969 | Cornell | 144/351 |
| 3,538,968 | 11/1970 | Gluck | 144/371 |
| 3,595,287 | 7/1971 | Indermark | 144/136 G |
| 3,605,534 | 5/1967 | Barr | 409/304 |
| 3,841,369 | 10/1974 | Roche | 144/346 |
| 4,118,268 | 10/1978 | Price | 156/510 |

*Primary Examiner*—Ivars Cintins
*Attorney, Agent, or Firm*—Christel, Bean & Linihan

[57] ABSTRACT

An apparatus and associated method for grooving a relatively rigid planar laminate sheet structure of the type having a relatively rigid substrate layer and a flexible sheet layer fixedly overlying the substrate layer to facilitate the folding of the sheet structure about a right corner defined by two planar surfaces of a polygonal panel during a laminating operation utilizes a circular rotatable grooving blade having teeth having cutting edges providing in cross-section, a V having an apex directed generally radially outwardly of the blade and further utilizes a member associated with the blade for defining first and second guide planes. The teeth cutting edges are adapted to form a V-sectioned groove in the laminate sheet structure as the blade is rotated within a plane oriented generally perpendicular to the plane of the laminate sheet and moved in operative grooving engagement across the laminate sheet. The provided V has a projected height which is about equal to the thickness of the substrate layer of the laminate sheet to be grooved, and has one leg which terminates at a point which rotates, as the blade is operatively rotated, within one blade plane oriented to one side of the blade body. The first guide plane is coincident with the defined one blade plane, and the second guide plane is oriented generally perpendicular to the first and spaced from the rotational axis of the blade a distance equal to the distance between the rotational axis and the apex of the provided V minus the projected height of the provided V so that by placing one corner-defining surface of a polygonal panel against the substrate side of a laminate sheet and moving the apparatus relative to the laminate sheet to be grooved with the first guide plane in sliding engagement with the other corner-defining surface of the panel, the second guide plane in sliding engagement with the laminate sheet, and the grooving blade in operative grooving engagement with the laminate sheet, the blade forms a V-sectioned groove in the laminate sheet adajcent the panel corner, which groove has a depth equal to about the projected height of the provided V. In the resulting V-sectioned groove, the substrate layer of the laminate sheet is substantially severed while the flexible sheet layer remains uncut.

19 Claims, 11 Drawing Figures

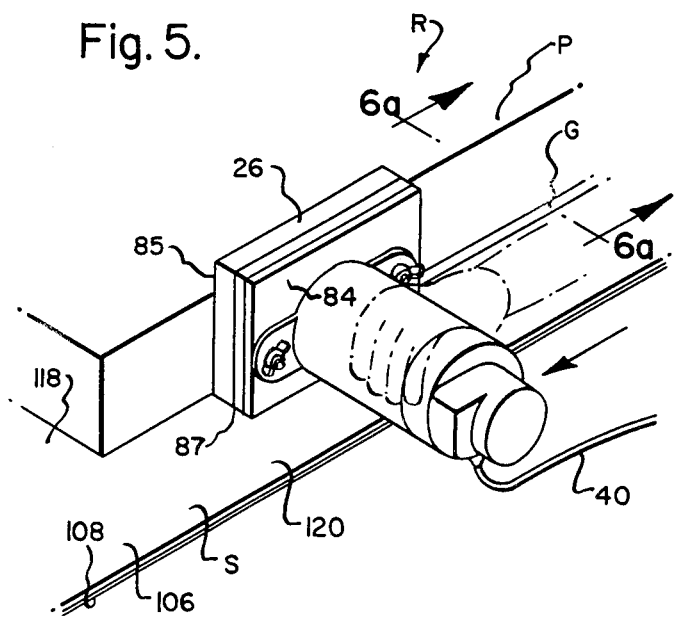
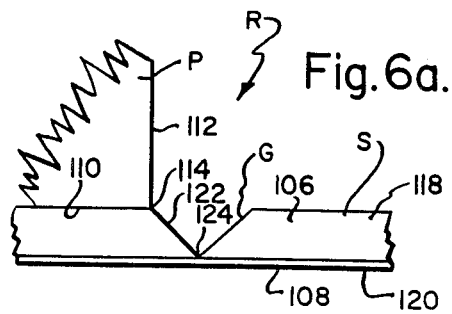
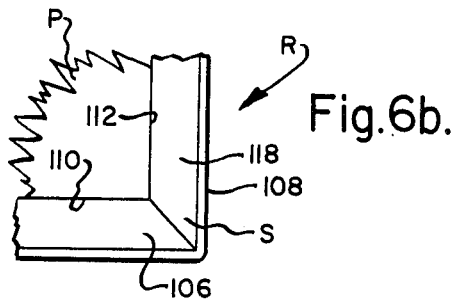
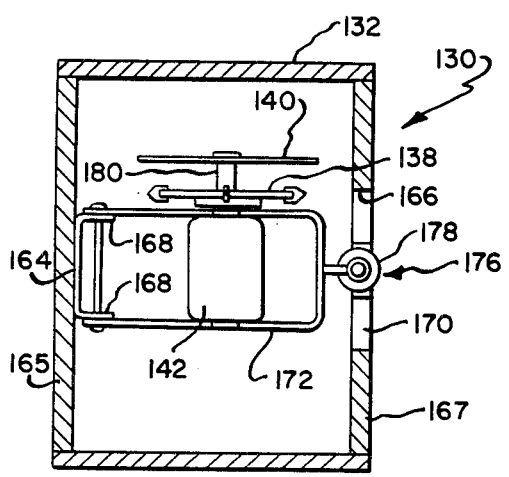
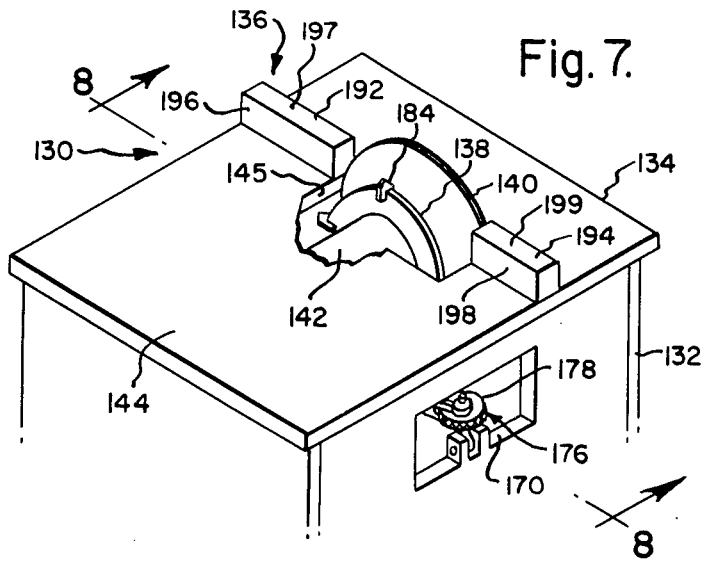
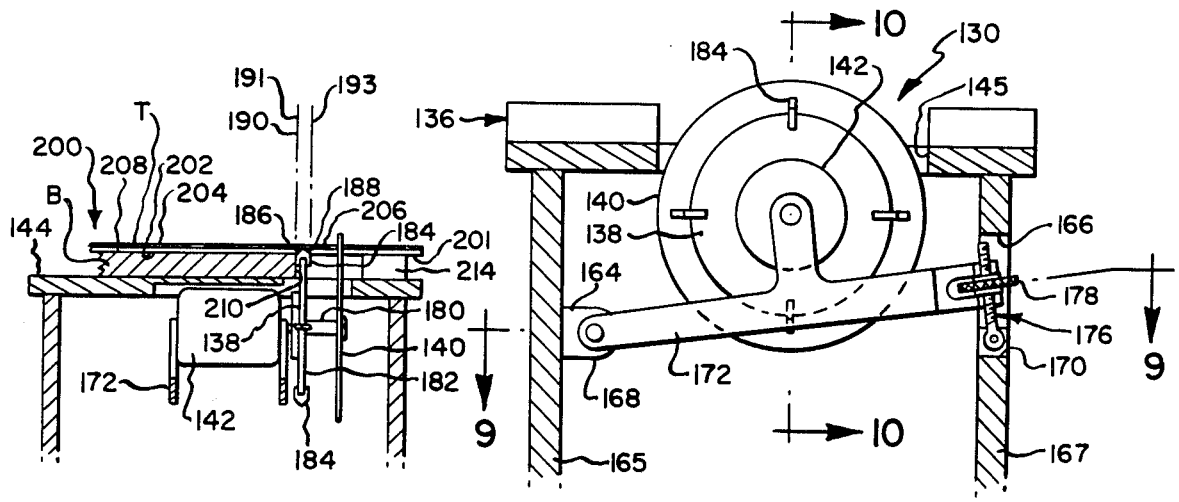

APPARATUS AND METHOD FOR GROOVING A LAMINATE SHEET

BACKGROUND OF THE INVENTION

This invention relates generally to the laminating of panels for cabinets and the like and relates, more particularly, to the wrapping or folding of laminate sheet structure around corners of a panel during a laminating operation.

It is known that to provide a polygonal base panel for cabinets or the like with unbroken laminations of relatively rigid laminate sheet structure extending from one face over one or more corners of the panel, a relatively deep and ninety degree V-sectional groove can be milled or cut in the laminate sheet structure to permit the sheet structure to be folded around a corner of the panel. One such method and apparatus for milling a groove in the laminate structure is described in U.S. Pat. No. 3,841,369.

It is a general object of the present invention to provide a new and improved apparatus and method facilitating the folding of laminate sheet structure around a corner of a base panel.

Another object of the present invention is to provide such an apparatus and method for forming a groove in laminate sheet structure for the purpose of folding the sheet structure around a corner of a panel.

Still another object of the present invention is to provide such an apparatus having a cutting blade with relatively few cutting edges which must be maintained in a sharpened condition for a grooving operation.

A further object of the present invention is to provide a new and improved hand-held apparatus for grooving laminate sheet structure.

A still further object of the present invention is to provide such a hand-held apparatus which protects an operator from flying chips or dust severed from a laminate sheet during a grooving operation.

SUMMARY OF THE INVENTION

This invention resides in an apparatus and associated method for grooving a relatively rigid laminate sheet structure of the type having a relatively rigid substrate layer and a flexible sheet layer fixedly overlying the substrate layer to thereby facilitate the folding of the sheet structure around a corner of a polygonal base panel during a laminating operation. The apparatus of the invention is used in connection with a straight-edged guide member held in stationary relationship across the substrate side of a laminate sheet structure to be grooved.

The apparatus of this invention is comprised of a rotatable cutting blade including a circular body having one side face positionable alongside the straight-edged member so as to generally face the straight edge of the straight-edged member and means attached about the circumferential periphery of the blade body defining cutting edges providing, in section, a V. The V provided by the defined cutting edges includes an apex directed generally radially outwardly of the blade body for cutting a V-shaped groove in the laminate sheet structure as the blade is rotated within a rotational plane oriented generally perpendicular to the sheet structure and operatively guided along the straight edge of the straight-edged member in grooving engagement with the sheet structure. The provided V has a projected height as the cutting edges are viewed in section which is about equal to the thickness of the substrate layer of the laminate sheet structure and has one leg which terminates at a point which rotates, as the blade is operatively rotated, within one blade plane oriented to one side of the blade body.

The apparatus further includes means associated with the blade defining a first guide plane which is coincident with the one blade plane and engageable with the straight edge of the straight-edged member so that as the first guide plane-defining means is guided along the straight edge with the blade in operative grooving engagement with the laminate sheet structure at a cutting depth which is about equal to the projected height of the provided V, the blade forms a V-sectioned groove in the laminate sheet structure adjacent the straight edge.

The method of this invention includes the steps involved in utilizing the apparatus of this invention with a straight-edged member for grooving a laminate sheet structure of the aforedescribed type. The straight-edged member is placed across the substrate side of the laminate sheet structure so that straight edge of the straight-edged member is held in stationary relationship alongside the desired path of the groove in the sheet structure, and the apparatus is moved relative to the laminate sheet structure with the first guide plane slidably engaging the straight edge of the straight-edged member and the blade being maintained at a grooving depth which is about equal to the projected height of the provided V.

BRIEF DESCRIPTION OF THE DRAWING FIGURES

FIG. 5 is a perspective view of the FIG. 1 embodiment being utilized to form a groove in a laminate sheet.

FIG. 6a is cross-sectional view taken about on line 6a-6a of FIG. 5.

FIG. 6b is a view similar to FIG. 6a illustrating the laminate sheet being folded about a corner of the base panel.

FIG. 7 is a perspective view, shown partially cutaway, of another embodiment of the apparatus in accordance with the present invention.

FIG. 8 is a cross-sectional view taken about on line 8—8 of FIG. 7.

FIG. 9 is a cross-sectional view taken about on line 9—9 of FIG. 8.

FIG. 10 is a cross-sectional view taken about on line 10—10 of FIG. 8 illustrating the apparatus being utilized to form a groove in a laminate sheet and cut the sheet to a desired length.

DETAILED DESCRIPTION OF THE ILLUSTRATIVE EMBODIMENTS

Figure 1:
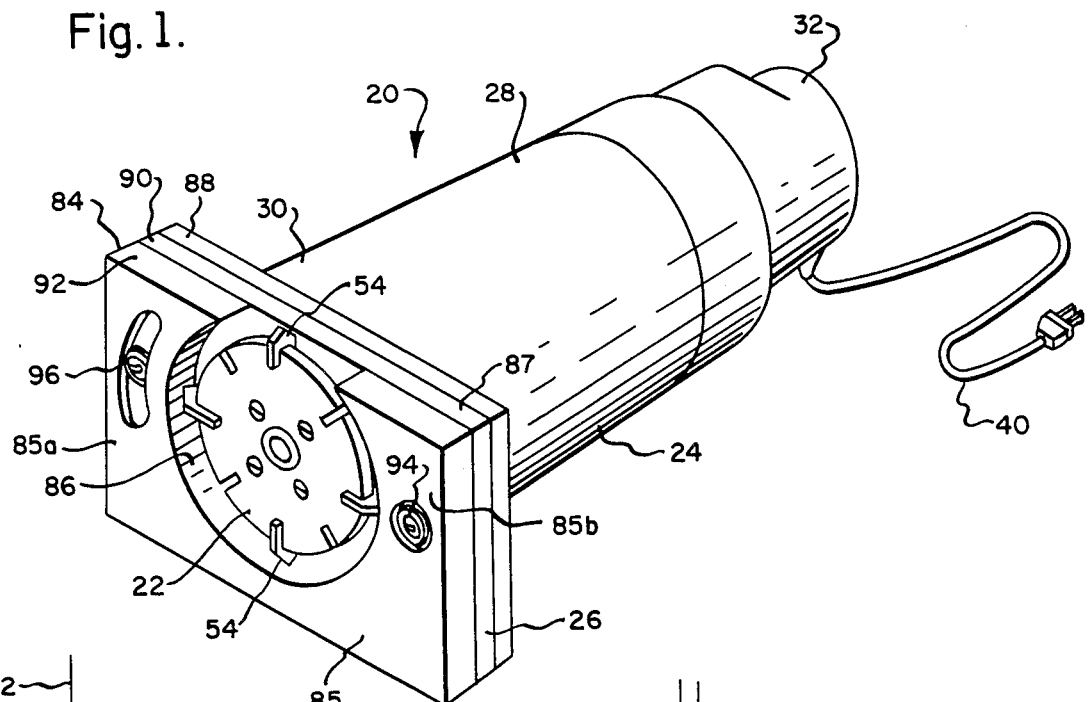
FIG. 1 is a perspective view of an embodiment of an apparatus in accordance with the present invention.

Turning now to the drawings in greater detail and considering first FIG. 1, there is shown an embodiment, generally indicated 20, of a grooving apparatus in accordance with the present invention. The apparatus 20 includes a grooving blade 22, means 24 for rotating the blade 22 and a fencing system 26. A groove is effected in a laminate sheet as the apparatus 20 is moved relative to and across the laminate sheet structure with the blade 22 in grooving, or cutting, engagement therewith. As will be explained in greater detail hereinafter, the fencing system 26 defines a first guide plane for engagement with a straight-edged member for purposes of guiding the blade 22 along a linear path from one edge of the sheet structure to another and a second guide plane for engagement with the sheet structure for purposes of limiting the cutting depth of the blade 22 and, thus, the depth of the resulting groove in the laminate sheet structure.

Figure 2:
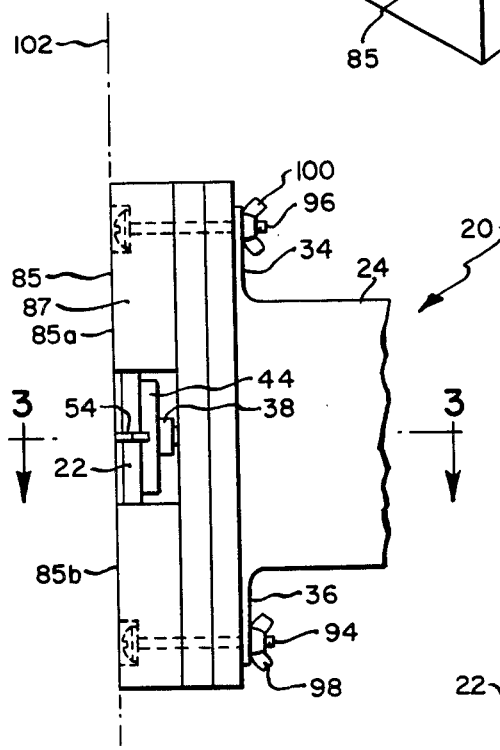
FIG. 2 is a plan view of the FIG. 1 embodiment as seen from above in FIG. 1.
Figure 3:
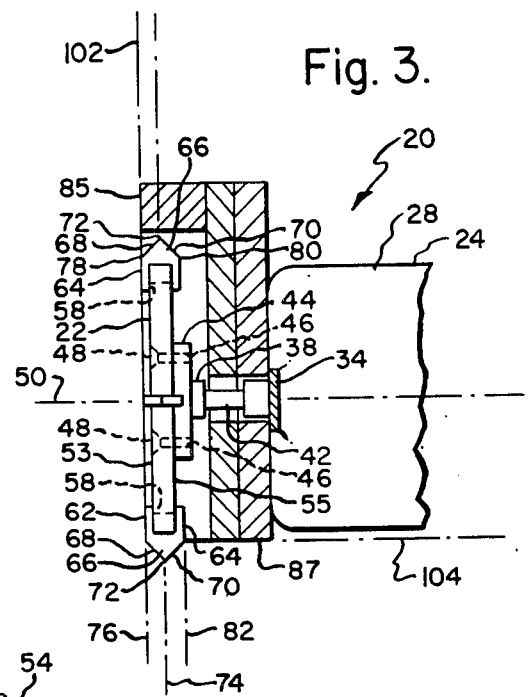
FIG. 3 is a cross-sectional view taken about on line 3—3 of FIG. 2.

With reference to FIGS. 1–3, the rotating means 24 includes a generally cylindrical housing 28 and an electric motor (not shown) mounted within the housing 28 for rotating the blade 22. The housing 28 is of such size to be manually held and manipulated during a grooving operation, defines two opposite ends 30,32 and includes radially outwardly-extending flanges 34,36 adjacent the housing end 30. Each of the flanges 34 or 36 is centrally apertured for a reason hereinafter apparent.

The electric motor of the rotating means 24 includes a rotor suitably journalled within the housing 28 for rotation relative thereto, and the rotating means 24 further includes a blade-holding arbor 38 suitably attached to one end of the rotor for rotational movement therewith. Electrical power for the electric motor is supplied through the cord 40.

As best shown in FIG. 3, the blade-holding arbor 38 includes a spindle portion 42 and a circular plate-like attachment portion 44 fixedly attached to the end of the spindle portion 42. The attachment portion 44 defines internally threaded holes 46,46 to threadably receive the shanks of blade-securing screws 48,48. When rotating with the spindle portion 42, the attachment portion 44 rotates within a plane oriented generally perpendicular to the rotational axis, indicated 50, of the spindle portion 42.

Figure 4:
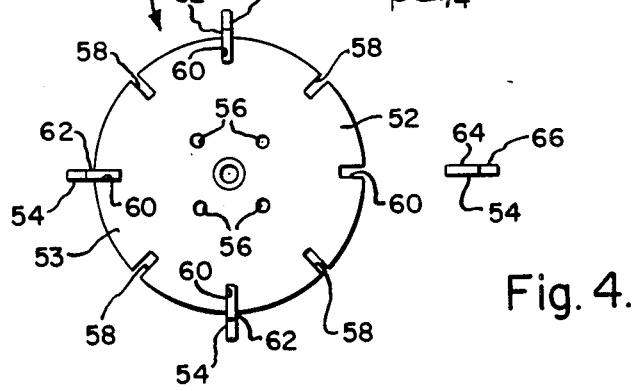
FIG. 4 is an elevation view of the blade of the FIG. 1 embodiment shown partially exploded.

With reference to FIGS. 3 and 4, the blade 22 includes a generally planar, circular body 52 having two opposite faces 53,55 and means defining four cutting teeeth 54,54. The body defines two opposite faces 53,55 and four countersunk mounting holes 56,56. As shown in FIG. 3, the mounting holes 56,56 are aligned with the attachment portion holes 46,46 for receiving the shanks of the screws 48,48. With the screws 48,48 extending through the countersunk holes 56,56 and tightened with the attachment portion holes 46,46, the blade 22 is securely retained between the attachment portion 44 and the heads of the screws 48,48.

Defined along the circumferential periphery of the body 52 and spaced at equal intervals therealong are four teeth-accepting notches 60,60 and four slots 58,58, each slot 58 being positioned intermediate of two notches 60,60. Each notch 60 or 60 is shaped so as to form two ninety degree corners, as viewed in FIG. 4, and opens in a direction generally radially outwardly of the blade body 52. Each intermediate slot 58 or 58 is generally elongated in shape and opens in a direction generally radially outwardly of the body 52.

Each teeth 54 or 54 includes an elongated body 62 having a thin, generally rectangular portion 64 and a thin pointed, or triangular, portion 66 attached to the rectangular portion 64. The rectangular portion 64 includes a small notch adapted to mesh with the notch 60 of the blade body 52 for positioning each of the rectangular portions 64,64 in a corresponding plane oriented generally perpendicular to the plane of the blade body 52 and including the rotational axis 50 of the blade body 52. The teeth 54,54 are attached, as by welding, to the blade body 52 with the teeth notches 58,58 in meshing engagement with the blade body notches 60,60.

As best viewed in FIG. 3, the pointed portion 66 of each blade tooth 54 includes cutting edges 68,70 which as viewed in section, as in FIG. 3, provide a V. The provided V of each tooth 54 has an apex 72 which is directed generally radially outwardly of the blade body 62 and is positioned within the midplane, indicated 74, of the blade body 74. Furthermore, and as viewed in FIG. 3, the apex of each V includes an interior angle of about ninety degrees and is bisected by the midplane 74 of the blade body 52.

Each cutting edge 68 or 70 extends from the apex 72 of the pointed portion 66 and terminates at a point 78 or 80 on the opposite side of the blade body midplane 74 from the termination point 80 or 78 of the corresponding blade edge 70 or 68. Collectively, the termination points 78,78 of the cutting edges 68,68 of all four teeth 54,54 are contained in one blade plane, indicated 76, oriented to one side of the blade body 62 and arranged generally parallel to the blade body midplane 74. Similarly, the termination points 80,80 of the cutting edges 70,70 of the teeth 54,54 are contained in another blade plane, indicated 82, oriented to the other side of the blade body 62 and arranged generally parallel to the blade body midplane 74.

As best viewed in FIG. 3, the provided V of the cutting edges 68,70 has a projected height as measured between a tooth apex 72 to an imaginary line oriented perpendicular to the blade body midplane 74 and containing the termination points 78 and 80 of the cutting edges 68,70.

Referring again to FIGS. 1–3, the fencing system 26 is in the form of a substantially rigid block 84 having a C-shaped recess 86 defined in one side thereof to accommodate the blade 22. The block 84 is comprised of three layers 88, 90,92 of a hard plastic, such as is manufactured and sold under the tradename Plexiglass. Each layer 88,90 or 92 is generally rectangular in shape with outermost edges which are even with its adjacent layer, and layer 92 includes a C-shaped notch which provides the C-shaped form recess 86 of the block 84.

The layers 88,90 and 92 define aligned holes for receiving the shank of a recessed bolt 94 and define aligned slots for receiving the shank of a recessed bolt 96. The bolts 94 and 94 each extend through a corresponding one of the apertures in the housing flanges 34 and 36, and wing nuts 98,100 are secured about the threaded ends of the bolts 94,94. The aligned slots of the block 84 define an arc centered about the bolt 94 so that by appropriately loosening the wing nuts 98,100 and pivoting the block 84 about the bolt 94, the fencing system 26 can be adjusted, in a manner hereinafter set forth, to accommodate any blade within a broad range of blade sizes.

With reference to FIGS. 2 and 3, the fencing system block 84 includes a smooth surface 85 defining a first guide plane, indicated 102, which is coincident with the blade plane 76. As shown in FIG. 1, the surface 85 includes portions 85a and 85b which are positioned fore and aft of the blade 22. Furthermore and with reference again to FIG. 3, the block 84 includes a smooth surface 87 defining a second guide plane, indicated 104, oriented at a right angle to the first guide plane 102. The second guide plane 104 is so arranged in relation to the blade 22 that when the blade 22 is arranged with a tooth 54 or 54 in its downwardmost position, as viewed in FIG. 3, of travel, the tooth termination points 78,80 are contained in the second guide plane 104. Thus, the second guide plane is spaced from the rotational axis 50 of the blade body 52 a distance equal to the distance between the rotational axis 50 and the apex 72 of the provided V of the teeth cutting edges 68,70 minus the projected height of the provided V.

There is shown in FIG. 5, 6a and 6b a prelaminated panel R including a laminate sheet S and a base panel B. The laminate sheet S is of the type adapted to be grooved by the apparatus 20 for folding a portion of the sheet S about a corner of the panel B. The laminate sheet S includes a core or substrate 106 of a relatively hard, brittle, rigid material, such as a melamine resin, and an attached layer 108 of flexible sheet material such as a sheet of decorative tape. Commonly, the thickness of the sheet core 106 comprises a substantial portion of the thickness of the laminate sheet S. The base panel P includes two planar surfaces 110,112 which meet at a corner 114. For a reason which will be hereinafter apparent, the planar surface 112 provides a straight edge 116 positioned adjacent the desired path of the groove indicated G.

The laminate sheet S includes a major portion 118 and a marginal portion 120 bordering the major portion 118. The core side of the laminate sheet S is fixedly attached, as with glue, to the planar surface 110 of the base panel P so that the marginal portion 118 of the sheet S extends generally away from the corner 114 and forms a generally right angle with the panel surface 112 as shown in FIG. 6a.

For purposes of forming the groove G in the core 106 of the sheet S adjacent the straight edge 116 of the panel P, the apparatus 20 is moved along the sheet S with its first guide plane in sliding engagement with the panel surface 112, with its second guide plane in sliding engagement with the core side of the sheet S, and its blade 22 in cutting engagement with the sheet core 106. In accordance with the apparatus 20 of the present invention, the projected height of the provided V of the blade cutting edges 68,70 is about equal to the thickness of the core 106 of the sheet S to be grooved. It will be understood that the second guide plane 104 maintains the cutting depth of the blade 22 to a depth equal to the height of the projected V of the blade cutting edges 68,70. The resultant groove G, as viewed in FIG. 6a, is generally V-shaped in cross section, extends alongside the panel surface 112 and has one side indicated 122, which extends from the groove bottom, indicated 124, and terminates along a line adjacent the panel corner 114.

Because the projected height of the V of the blade cutting edges 68,70 is about equal to the thickness of the core 106 of the laminate sheet S, the blade 22 substantially severs the rigid core 106 of the laminate sheet S as the blade 22 is moved in grooving engagement thereacross and leaves uncut the flexible decorative layer 108. Thus and as shown in FIG. 6b, the marginal portion 120 of the sheet S, grooved from one edge of the sheet S to another, is permitted to be hingedly moved about the uncut flexible sheet layer 108 extending generally along the groove bottom 124 and placed against the panel surface 112. For purposes of attaching the marginal portion 120 to the panel surface 112, a glue or a suitable cement can be spread therebetween prior to the placing of the marginal portion 120 against the panel surface 112. Once the marginal portion 120 is folded against the panel surface 112, the uncut decorative layer 108 provides the panel P with a seamless and unbroken lamination about the panel corner 114 and so that no portion of the sheet core 106 is exposed at the corner 114.

Thus, the apparatus 20 provides a relatively small, easily manipulatable device for forming a V-sectional groove in laminate sheet structure overlain by a base panel or other straight-edged member. Furthermore, inasmuch as an alternative blade having cutting edges providing, in section, a V having a projected height other than that provided by the cutting edges of the blade 22 is required for grooving laminate sheet having a core layer having a thickness other than that of the core layer 106 of sheet S, the fencing system 26 is adjustable, by means of its pivotal connection about the bolt 94 (FIG. 1) to limit the cutting depth of the alternative blade to the projected height of the V provided by the blade cutting edges. The fencing system 26 can be adjusted for the aforedescribed purpose by loosening the wing nuts 98,100, appropriately pivoting the fence system block 84 about the bolt 94, and retightening the wing nuts 98,100. Still further, the fence system 26 provides the apparatus 20 with a guard for protecting an operator from flying chips or dust severed from the laminate sheet S as the sheet S is being grooved with the apparatus.

For purposes of illustration, the following dimensions of the blade 22 are provided. For purposes of grooving a laminate sheet S having a rigid core thickness of about 0.0605 inches and a flexible layer thickness of about 0.002 inches, the projected height of the provided V is about 0.0605 inches. Furthermore, for purposes of preventing overheating between the blade face 53 and the planar surface 112 of the base panel P as the blade 22 is guided therealong, the face 53 is spaced from the one blade plane 72, and thus the first guide plane 102, about 0.005 inches.

With reference to FIGS. 7-10, there is shown an alternative embodiment, generally indicated 130, of the apparatus in accordance with the present invention. The apparatus 130 includes a support frame 132 including a table 134, a fence 136 mounted atop the table 134, pair of blades 138, 140, and an electric motor 142 for rotating the blades 138, 140. The table 134 defines a generally planar support surface 144 for supporting a workpiece W (FIG. 8) thereupon and defining a central cutout 145 to accommodate the blades 138,140 extending upwardly therethrough. The blades 138,140 are attached to an arbor 180 which is, in turn, connected to the electric motor 142 for rotation about a rotational axis oriented generally parallel to the support surface 144.

The support frame 132 includes a four-sided base structure having a mounting bracket 164 attached to one side, indicated 165, thereof as shown in FIG. 9, and defines a window 166 in the opposite side, indicated 167, thereof as shown in FIG. 7. The mounting bracket 164 has two projecting lugs 168,168 and the window 166 includes a lowermost ledge 170. Extending between the bracket 164 and the window 166 is a motor mount 172 having one end 174 being pivotally secured to the lugs 168,168 of the bracket 164 and the other end being attached to a screw jack 176 supported, in turn, upon the window ledge 170. By adjusting the jack 176 by means of the knob 178 attached thereto, the motor mount 172 pivots about the bracket lugs 168,168 to adjust the blade height in relationship to the support surface 144 or the distance that each of the blades 138,140 extend through the central circuit 145 in the support surface 144.

The arbor 180 is adapted to releasably and securely retain the blades 138,140 in spaced relationship to one another and for rotation in planes which are generally parallel to one another and generally perpendicular to the support surface 144. As best shown in FIG. 10, the blade 138 includes a circular body 182 and teeth 184,184 spaced about the circumferential periphery thereof. Each tooth 184 defines two cutting edges 186,188 which are oriented at generally a right angle with one another so as to provide a V when the tooth 184 is viewed in cross section. The cutting edges 186 188 of each tooth 184 extends from the apex of the provided V to a point on opposite sides of the tooth body. Collectively, the tooth body points located on one side of the blade 138 at which the cutting edges 186,186 terminate define one blade plane, indicated 190, oriented to one side, or the left side as viewed in FIG. 9, of the blade 138. Similarly, the tooth body points at which the cutting edges 188,188 terminate define another blade plane, indicated 192, oriented to the other side of the blade 138. It will be understood that the path traveled by each of the aforediscussed points of termination of the cutting edges 186,186 or 188,188 as the blade 138 is operatively rotated is contained in either the blade plane 190 or blade plane 192. Furthermore, the provided V of the tooth cutting edges 186,188 has a projected height as measured from the apex of the V to a point located midway between the free ends of the legs of the V.

The blade 140 has a diameter which is slightly larger than that of the blade 138 for a reason hereinafter apparent.

With reference to FIGS. 7 and 10, the fence 136 includes two body members 192,194 fixedly secured, as with screws, atop the table 134 and positioned fore and aft, respectively, of the blade 138. Each fence body 192 or 194 is substantially rectangular in shape and is positioned upon the support surface 144 so that the longitudinal axis of each body 192 or 194 aligns with the longitudinal axis of the upper body 194 or 192. The fence bodies 192,194 define side planar surfaces 196, 198, respectively, which collectively provide a first guide plane 191 which is coincident with the blade plane 190 located on one side of the blade 138. Furthermore, the bodies 192,194 define top planar surfaces 197,199, respectively, which collectively provide a second guide plane 201 oriented generally perpendicular to the first guide plane 191 and which includes the points of termination of the cutting edges 186,186 of a tooth 184 when the tooth is located in its uppermost position, as shown in FIG. 10, of travel.

With reference still to FIG. 10, the workpiece W is in the form of a prelaminated panel 200 including a base panel B and a laminate sheet T attached hereto. The base panel B is polygonal in shape and defines planar surfaces 208, 210, 212, as shown, which meet at right corners, and the laminate sheet T includes a core layer 202 of relatively rigid sheet material and a layer 204 of flexible, decorative sheet material. The core side of the laminate sheet T is attached to one planar surface 208 of the base panel B, so that a marginal portion, indicated 206, of the laminate sheet T extends away from and forms a right angle with the planar surface 210.

In accordance with the apparatus of this invention, the projected height of the V of the teeth cutting edges 186,188 is about equal to the thickness of the core layer 202 of the laminate sheet T, and the top planar surfaces 197,199 of the fence bodies 192,194, and thus the second guide plane 201, is spaced above support surface 144 a distance which is about equal to the thickness of the base panel B.

In order to utilize the apparatus 130 to groove the laminate sheet T, the prelaminated panel 200 is placed, panel-side-down, atop the support surface 144 so that the planar edge 210 of the panel B abuts one of the side planar surfaces 196,198 of the fence 136 and so that the marginal portion 206 of the laminate sheet T lies across the top planar surface 197 or 199 of the fence 136. If desired, a block 214 can be placed between the marginal portion 206 and support surface 144 to one side, or the right side as shown in FIG. 10, of the blade 140 to help support the marginal portion 206 in a planar condition. Because the second guide plane 201 is spaced from the support surface 144 a distance which is about equal to the thickness of the base panel B and the projected height of the provided V of the tooth cutting edges 184,186 is about equal to the thickness of the core layer 202 of the laminate sheet T, the apex of each blade tooth 184, when positioned in its uppermost position of travel, as shown in FIG. 10, is positioned above the support surface 144 a distance which is about equal to the combined thicknesses of the base panel B and the core layer 202 of the laminate sheet T. The position of the blade 140 in relation to the blade 138 is adjusted along the length of the blade arbor 180 so that the spacing between the blades 138,140, or more specifically, the blade plane 193 and blade 140, is about equal to the thickness of the base panel B.

With the electric motor 142 energized, the prelaminated panel 200 is moved relative to and across the support surface 144 so that the panel edge 210 moves in sliding engagement with the side surfaces 196,198 of the fence 136 so that the grooving blade 138 moves in cutting or grooving engagement with the core layer 202 of the sheet 10 and the cutting blade 140 moves in cutting engagement with, so as to sever, the sheet T. The grooving blade 138 thereby provides a V-sectional groove in the laminate sheet T adjacent the panel surface 210, and the cutting blade 140 severs or trims the marginal portion 206 to a width equal to about the thickness of the base panel B. Thus, the marginal portion 206 can be folded about the formed groove against the panel surface 210 and has a trimmed edge which when folded against the panel surface 210 is substantially even with the planar surface 212 of the base panel B.

It follows from the above that the apparatus 130 can be utilized for providing a V-sectional groove in a laminate sheet facilitating the folding of the sheet of the corner of a polygonal panel and for trimming the portion of the sheet desired to be folded to a desire length.

It will be understood that numerous modifications and substitutions can be made to the aforedescribed embodiments without departing from the spirit of the invention. For example, although the apparatus 20 of FIGS. 1-5 have been shown and described as including a blade 122 having four teeth 54,54, and apparatus in accordance with the present invention can have an alternative number of cutting teeth. Furthermore, although the interior angle of the provided V of the blade 22 or 138 of the aforedescribed apparatus 20 or 130 has been described as about ninety degrees, the interior angle may be slightly larger to accommodate glue when the laminate sheet is folded about the groove. Still further, although the utilization of the apparatus 20 and the apparatus 130 has been described in connection with prelaminated panels, in which a laminate sheet was attached to a panel, it will be understood that the laminte sheet grooved by either apparatus 20 or 130 can be unattached to a base panel and simply overlain by a straight-edged member or panel for guiding the apparatus blade along a linear path. Accordingly, the aforedescribed embodiments are intended for purposes of illustration and not as limitation.

I claim:

1. An apparatus for use with a straight-edged member held in stationary relationship across the substrate side of a laminate sheet of the type having a relatively rigid substrate layer and a flexible sheet layer fixedly overlying the substrate layer for grooving the laminate sheet adjacent the straight edge of the member, said apparatus comprising:

a rotatable blade adapted to rotate about an axis including a circular body having one side face positionable alongside a straight-edged member so as to generally face the straight edge of the straight-edged member and means attached about the circumferential periphery of said blade body defining cutting edges providing, in section, a V having an apex directed generally radially outwardly of said body for cutting a V-sectional groove in a laminate sheet as said blade is rotated within a rotational plane oriented generally perpendicular to the laminate sheet and guided in operative grooving engagement relative to and along the laminate sheet, the provided V having a projected height as said cutting edges are viewed in section which is about equal to the thickness of the substrate layer of the laminate sheet to be grooved and having one leg which terminates at a point which rotates, as said blade is operatively rotated, within one blade plane oriented to one side of said blade body; and means associated with said blade defining a first guide plane conicident with said one blade plane and engageable with the straight edge of the straight-edged member so that as said first guide plane defining means is guided along the straight edge with said blade in operative grooving engagement with the laminate sheet at a cutting depth which is about equal to the projected height of the provided V, said blade forms a V-sectioned groove in the laminate sheet adjacent the straight edge.

2. An apparatus as defined in claim 1 wherein said means associated with said blade includes means for limiting the grooving depth of said blade to the projected height of the provided V.

3. An apparatus as defined in claim 1 wherein said means associated with said blade includes means defining a second guide plane arranged generally perpendicular to said first guide plane and spaced from the rotational axis of said blade a distance about equal to the distance between the rotational axis of said blade and the apex of the provided V minus the height of the provided V, said second guide plane-defining means being engageable with the laminate sheet to be grooved so that as said second guide plane-defining means is guided along the laminate sheet, the grooving depth of said blade is limited to the projected height of the provided V.

4. An apparatus as defined in claim 1 wherein said means associated with said blade includes fencing means including portions positioned fore and aft of said blade for defining said first guide plane and defining a second guide plane arranged generally perpendicular to said first guide plane and spaced from the rotational axis of said blade a distance about equal to the distance between the rotational axis of said blade and the apex of the provided V minus the height of the provided V so that as said blade is moved in operative grooving engagement with the laminate sheet as said first guide plane is guided along the straight edge of the straight-edged member and said second guide plane is guided along the surface of the laminate sheet structure, said blade forms a V-sectioned groove in the laminate sheet adjacent the straight edge having a depth equal to about the projected height of the provided V.

5. An apparatus as defined in claim 4 wherein said fencing means includes a fence body having a first smooth surface defining said first guide plane, a second smooth surface defining said second guide plane, each of said smooth surfaces including portions positioned fore and aft of said blade.

6. An apparatus as defined in claim 1 wherein said one side face of said blade body is spaced and parallel to said first guide plane.

7. An apparatus as defined in claim 1 wherein said means attached about the circumferential periphery of said blade body includes a plurality of cutting teeth and said cutting edges are provided by edges of said cutting teeth.

8. An apparatus as defined in claim 1 wherein the internal angle of the provided V is about ninety degrees.

9. An apparatus as defined in claim 1 further comprising means for rotating said grooving blade about its rotational axis.

10. A grooving apparatus facilitating the folding of a laminate sheet of the type having a relatively rigid substrate layer and a flexible sheet layer fixedly overlying the substrate layer about a corner of a base panel having two planar surfaces which meet at the panel corner and wherein the substrate side of the laminate sheet is fixedly attached to one planar surface of the base panel and the laminate sheet includes a marginal portion extending generally away from and at a right angle to the other planar surface of the base panel; said apparatus comprising:

means defining a generally planar support surface upon which a base panel and an attached laminate sheet structure can be placed for working therewith;

a rotatable grooving blade supported adjacent said support surface including a circular body having two opposite side faces and means attached about the circumferential periphery of said blade body defining cutting edges providing, in section, a V having an apex directed generally radially outwardly of said blade body for cutting a V-sectioned groove in the laminate sheet as said blade is rotated within a plane oriented generally perpendicular to said support surface and moved in operative grooving engagement relative to and across the laminate sheet, the provided V having a projected height as said cutting edges are viewed in section which is about equal to the thickness of the substrate layer of the laminate sheet to be grooved and having one leg which terminates at a point which rotates, as said blade is operatively rotated, within one blade plane oriented to one side of said blade body; and means associated with said blade defining a first guide plane coincident with said one blade plane and engageable with the other planar surface of the base panel so that the other planar surface of the base panel can be placed in engagement with said first guide plane and the panel and laminate sheet can be moved relative to said blade with said blade in operative grooving engagement with said laminate sheet at a grooving depth equal to about the projected height of the provided V to form a V-sectioned groove in the laminate sheet adjacent the corner of the base panel.

11. An apparatus as defined in claim 10 further comprising a cutting blade associated with said grooving blade so as to rotate in a plane oriented parallel to the rotational plane of said grooving blade for trimming the marginal portion of the laminate sheet to a desired length.

12. In combination:
a planar laminate sheet structure of the type having a relatively rigid substrate overlain by a layer of flexible sheet material;
a base panel defining two generally planar surfaces which meet at a right corner, a portion of said substrate side of said sheet structure being fixedly attached to one planar surface of said base panel so that a marginal portion of said sheet structure extends outwardly from the right corner of said base panel and forms a right angle with the other planar surface of said base panel;
a grooving apparatus including a rotatable blade adapted to rotate about an axis and including a circular body having one side face positionable alongside said other planar surface of said base panel so as to generally face said other planar surface of said panel and means attached about the circumferential periphery of said blade body defining cutting edges providing, in section, a V having an apex directed generally radially outwardly of said blade body for cutting a V-sectioned groove in said laminate sheet structure as said blade is rotated within a rotational plane oriented generally perpendicular to said sheet structure and operatively guided in grooving engagement relative to and along said sheet structure, the provided V having a projected height as said cutting edges are viewed in section which is about equal to the thickness of said substrate layer of said laminate sheet structure and having one leg which terminates at a point which rotates, as said blade is operatively rotated, in one blade plane oriented to one side of said blade body and parallel to the rotational plane of said blade, said grooving apparatus further including means associated with said blade defining a first guide plane coincident with said one blade plane and engageable with said other planar surface defined by said base panel so that as said first guide plane-defining means is moved relative to and along said other planar surface in sliding engagement therewith and said blade is moved in cutting engagement with said laminate sheet structure at a cutting depth which is about equal to the projected height of the provided V, said blade forms a V-sectioned groove in said laminate sheet structure adjacent the right corner of said panel, said groove having a depth about equal to the thickness of said substrate layer so that the marginal portion of said sheet structure can be folded against said one planar surface of said base panel.

13. The combination of claim 12 wherein the interior angle of the provided V is about ninety degrees.

14. The combination of claim 12 wherein said grooving apparatus includes means defining a second guide plane oriented at a right angle to said first guide plane and spaced a distance from the rotational axis of said blade equal to the distance between the rotational axis of said blade and the apex of the provided V minus the projected height of the provided V so that as said grooving apparatus is moved relative to said sheet structure with said first guide plane in sliding engagement with said other planar surface of said panel and said second guide plane in sliding engagement with said sheet structure, the grooving depth of said blade is limited to the projected height of the provided V.

15. The combination of claim 12 wherein said one leg of the provided V corresponds to said one side face of said blade, said attached means include a plurality of cutting teeth each having cutting edges providing, in section, a V, the cutting edges of said teeth about said blade body each which define one leg of a provided V corresponding to said one said face of said body terminating at points which are contained in said one blade plane.

16. A method for grooving a planar laminate sheet of the type having a relatively rigid substrate layer and a flexible sheet layer fixedly overlying the substrate layer to facilitate folding of the sheet about a corner of a polygonal panel comprising the steps of:
providing a grooving apparatus including a rotatable blade including a circular body and means attached about the circumferential periphery of said blade body defining cutting edges providing in section, a V having an apex directed generally radially outwardly of said blade body for cutting a V-sectional groove in sheet structure as said blade is rotated within a rotational plane oriented generally perpendicular to the plane of the laminate sheet structure and is guided in operative grooving engagement therealong, the provided V having a projected height as said cutting edges are viewed in section which is about equal to the thickness of the substrate layer of the laminate sheet to be grooved and having one leg which terminates at a point which rotates, as said blade is operatively rotated, within one blade plane oriented to one side of said blade body, said grooving apparatus further including means associated with said blade defining a first guide plane concident with said one blade plane;
placing said straight-edged member across the substrate side of said the laminate sheet so that the straight edge thereof is fixedly positioned alongside the desired path of the groove; and
moving said grooving apparatus relative to the laminate sheet with said first guide plane slidably engaging said straight edge and said blade being maintained at a grooving depth which is about equal to the projected height of the provided V.

17. A method as defined in claim 16 wherein said grooving apparatus includes means defining a second guide plane oriented at a right angle to said first guide plane and spaced a distance from the rotational axis of said blade equal to the distance between the rotational axis of said blade and the apex of the provided V minus the projected height of the provided V and said step of moving slidably moves said second guide plane across the laminate sheet to thereby limit the grooving depth of said blade to the projected height of the provided V.

18. A method for laminating comprising the steps of:
providing a base panel defining two planar surfaces which meet at a right corner;
providing a planar laminate sheet structure having a layer of a relatively rigid substrate material and a layer of flexible sheet material fixedly overlying said substrate layer;
providing a grooving apparatus including a rotating cutting blade including a circular body and means attached about the circumferential periphery of said blade body defining cutting edges providing in section, a V having an apex directed generally radially outwardly of said blade body for cutting a V-sectional groove in said laminate sheet structure as said blade is rotated within a rotational plane oriented generally perpendicular to laminate sheet structure and guided in grooving engagement therealong, the provided V having a projected height as said cutting edges are viewed in section which is about equal to the thickness of said substrate layer of said laminate sheet structure and having one leg which terminates at a point which rotates, as said blade is operatively rotated, within one blade plane oriented to one side of said blade body, said grooving apparatus further including means associated with said blade defining a first guide plane coincident with said one blade plane;
fixing a portion of said substrate side of said sheet structure to one planar surface of said base panel so that a marginal portion of said sheet structure extends from the right corner of said base panel and forms a right angle with the other planar surface of said base panel;
moving said grooving apparatus relative to said laminate sheet structure from one edge of said sheet to another with said first guide plane slidably engaging said other planar surface of said base panel and said blade being maintained at a grooving depth which is about equal to the projected height of the provided V so that a groove is formed in said laminate sheet structure wherein said substrate layer is substantially severed and said flexible sheet is left uncut;
folding the marginal portion of said laminate sheet structure about the formed groove and toward said other planar surface of said base panel; and
fixing the marginal portion against said other surface.

19. A method as defined in claim 18 wherein said grooving apparatus includes means defining a second guide plane oriented at a right angle to said first guide plane and spaced at a distance from the rotational axis of said blade equal to the distance between the rotational axis of said blade and the apex of the provided V minus the projected height of the provided V and said step of moving slidably moves said second guide plane across said laminate sheet structure to thereby limit the grooving depth of said blade to the projected height of the provided V.

* * * * *